Dec. 12, 1944.    C. W. CHERRY ET AL    2,364,693
RIVET MAKING APPARATUS
Original Filed May 24, 1940    6 Sheets-Sheet 1

INVENTORS
CARL W. CHERRY
ALEX S. MULLGARDT
BY George B. White
ATTORNEYS

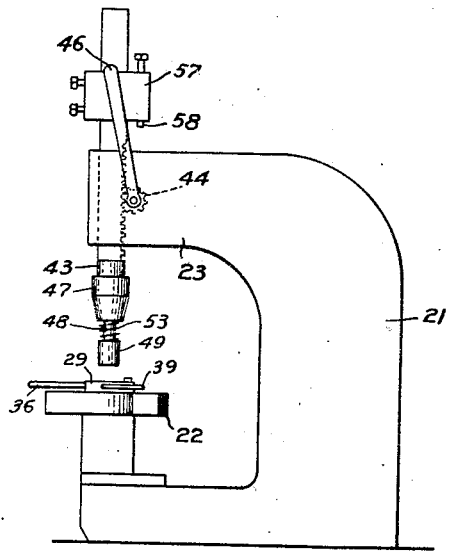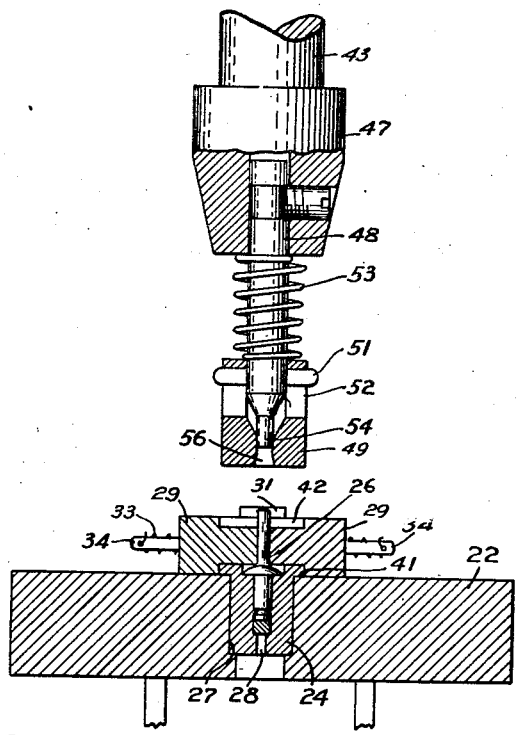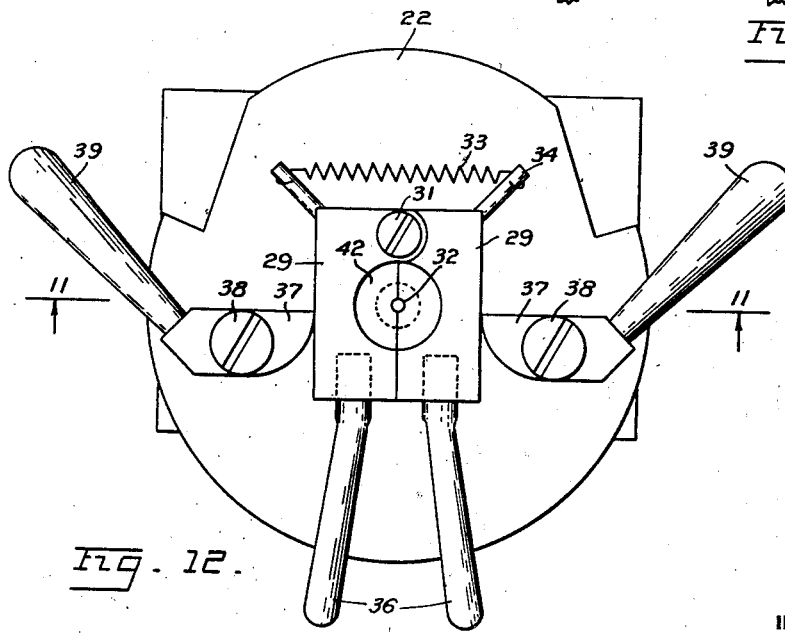

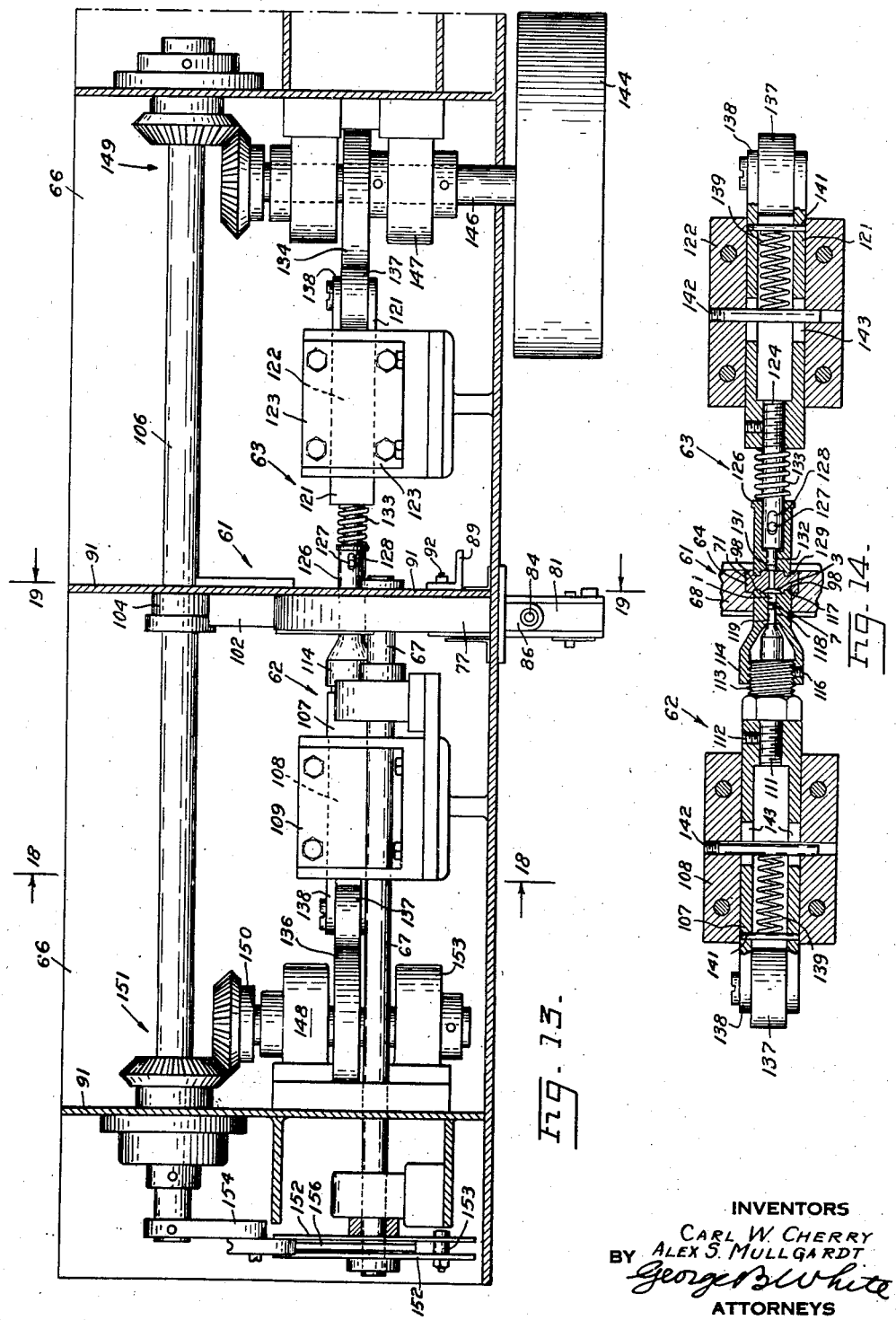

Dec. 12, 1944. C. W. CHERRY ET AL 2,364,693
RIVET MAKING APPARATUS
Original Filed May 24, 1940 6 Sheets-Sheet 4
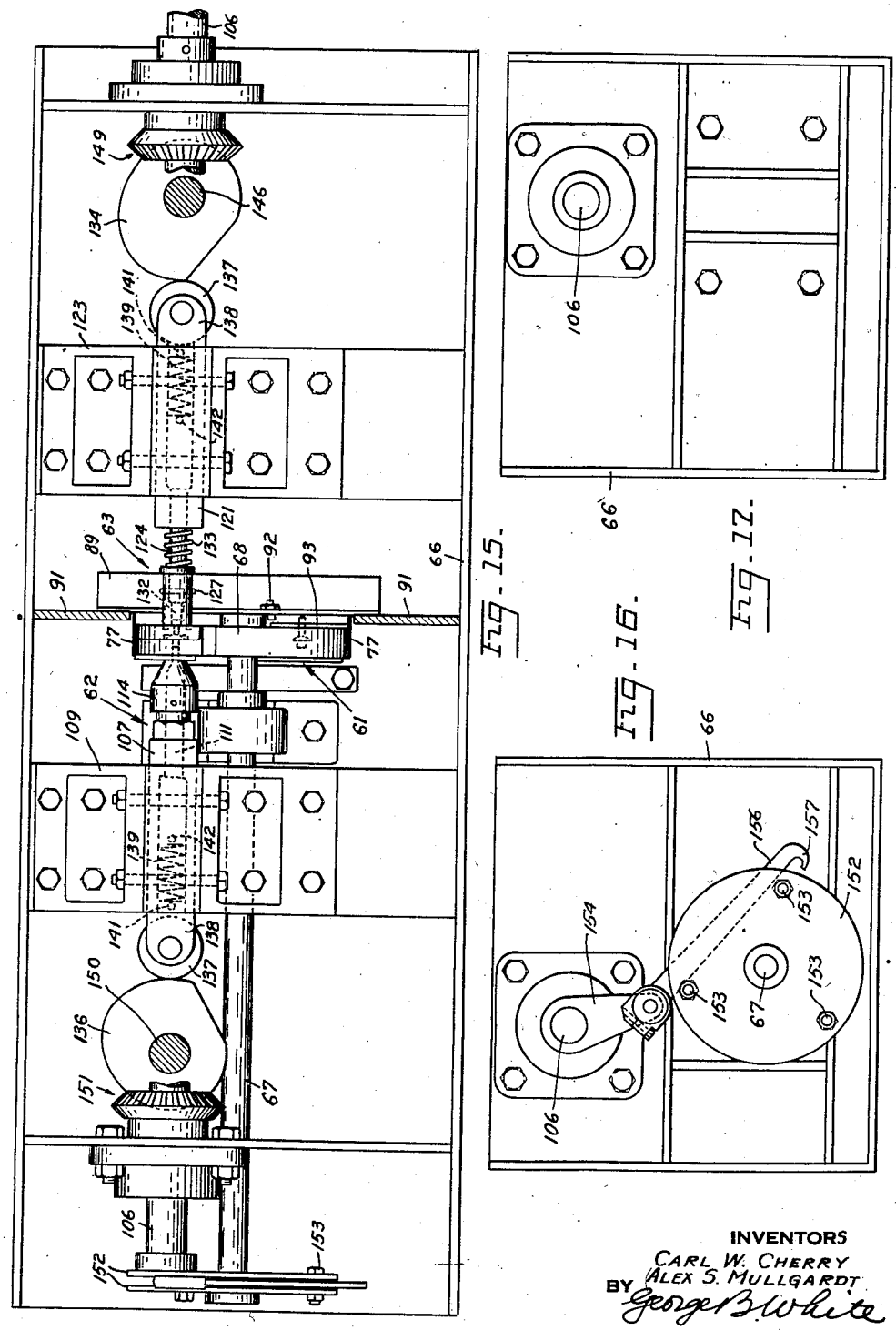
INVENTORS
CARL W. CHERRY
ALEX S. MULLGARDT
BY George B. White
ATTORNEYS

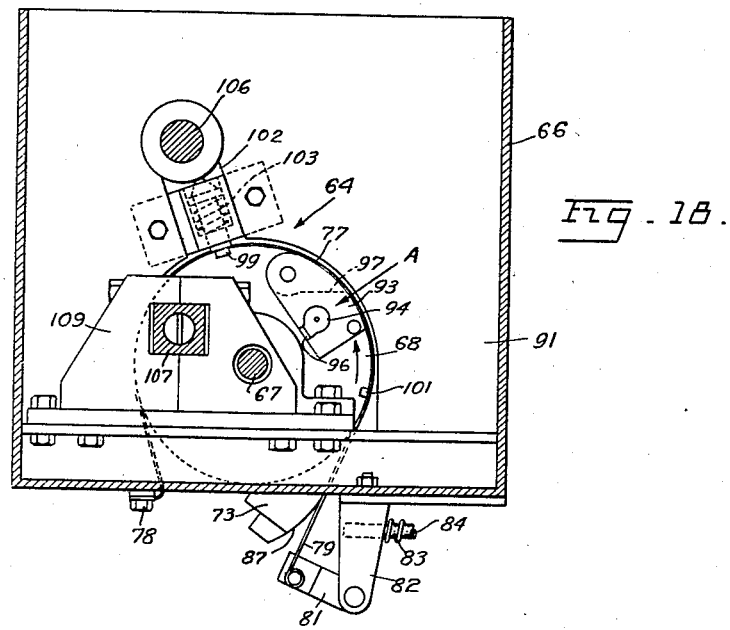
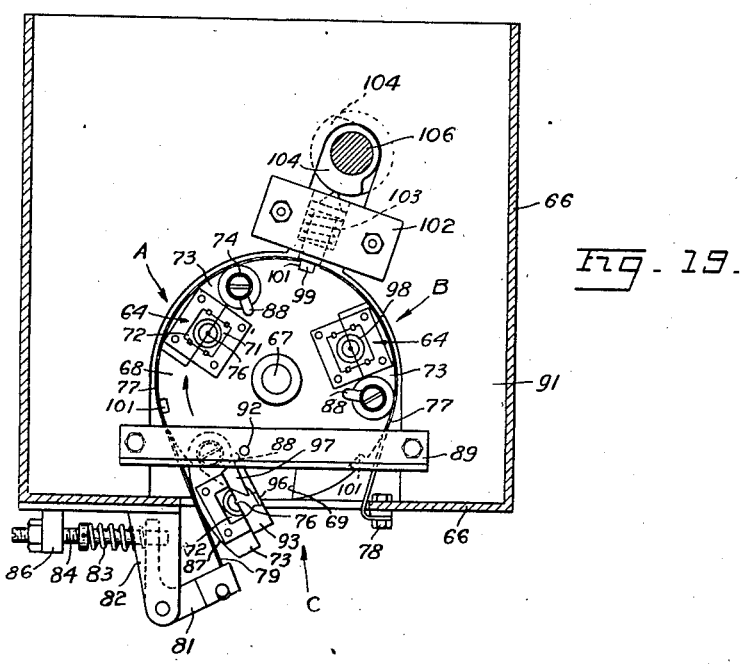

Dec. 12, 1944.   C. W. CHERRY ET AL   2,364,693
RIVET MAKING APPARATUS
Original Filed May 24, 1940   6 Sheets-Sheet 6

INVENTORS.
CARL W. CHERRY
ALEX S. MULLGARDT
BY George B. White
ATTORNEYS

Patented Dec. 12, 1944

2,364,693

UNITED STATES PATENT OFFICE 2,364,693

RIVET MAKING APPARATUS

Carl W. Cherry, Carmel, and Alex S. Mullgardt, Altadena, Calif.; said Mullgardt assignor to said Cherry Original application May 24, 1940, Serial No. 337,028, now Patent No. 2,317,360, dated April 27, 1943. Divided and this application March 27, 1943, Serial No. 480,870

18 Claims. (Cl. 10—13)

This invention relates to an apparatus for making rivets.

This application is a division of our application Serial No. 337,028, filed May 24, 1940.

An object of this invention is to provide an apparatus whereby rivet assemblies may be efficiently and speedily completed. The invention particularly applies to rivet assemblies wherein a tension member in a hole of a hollow rivet is pulled for forming the tail of the rivet against the object to be fastened. An example of such rivet assembly is shown in Patent No. 2,183,543, which form is utilized herein for illustrating the novel method and apparatus.

Another object of this invention is to provide an apparatus for forming a pulling surface or grip portion on the end of a tension member or forming stem after its assembly within the hollow rivet with which it is to be utilized, and to produce a rivet assembly wherein the relatively movable members are held in constant uniform relation until subjected to actual riveting force.

Another object of this invention is to provide an apparatus for forming a pulling head or gripping surface on the end of a movable stem in a rivet assembly, the forming operation being performed at such progressive force as to prevent any crystallization or unfavorable molecular strain at any part of the rivet assembly and wherein the strength of the material at said head or gripping portion is not diminished relatively to the strength at other portions.

Another object of this invention is to provide an apparatus which automatically forms a gripping surface or head on the movable tension member or stem of a rivet assembly without disturbing the assembly and without exerting any undue stress on the hollow rivet in which the stem is assembled.

Another object of this invention is to provide an apparatus wherein a rivet assembly including a hollow rivet and a former on a stem within the hollow rivet is held and progressive force is applied to the end of the stem for forming a pulling head or gripping surface thereon, the forces being so applied that the hollow rivet body is not subjected to any forces that may affect its dimensions or its strength, and the stem is so held and so subjected to forming pressure that the intended gripping portion of the stem is limited to a predetermined position.

Other objects of the invention together with the foregoing will be set forth in the following description of the preferred embodiment of means for practicing the same, which is illustrated in the drawings accompanying and forming part of the specification. It is to be understood that we do not limit ourselves to the embodiment disclosed in said description and the drawings as I may adopt variations of my preferred forms within the scope of my invention.

With the foregoing and other objects in view, which will be made manifest in the following detailed description, reference is had to the accompanying drawings for the illustrative embodiment of the invention, wherein:

Fig. 10 is a side view of a machine for forming said gripping head in accordance with our invention.

Fig. 11 is a fragmental sectional view of the head forming machine showing the holder and the movable former parts of the machine, the section being taken on the lines 11—11 of Fig. 12.

Fig. 12 is a plan view of the holder portion of the machine.

Fig. 13 is a side view of an automatic apparatus for forming the rivet stem head.

Fig. 14 is a fragmental longitudinal sectional view of the bucking head assembly and the forming head assembly in forming position engaged with the holder die.

Fig. 15 is a plan view of the automatic apparatus.

Fig. 16 is an end view of the automatic apparatus.

Fig. 17 is another end view of the automatic apparatus.

Fig. 18 is a sectional view of the automatic apparatus, the section being taken on lines 18—18 of Fig. 13.

Fig. 19 is a sectional view of the automatic apparatus, the section being taken on lines 19—19 of Fig. 13.

In connection with rivet assemblies of the type wherein the tail of the rivet is formed by means of pulling a tension member through the rivet body the problem of forming a suitable pulling or gripping portion for engagement by a riveting machine is difficult, because of the danger of deforming the body of the hollow rivet, or the weakening of the stem at its pulling end. This problem is particularly important in connection with rivet assemblies wherein the rivet stem is to be gripped and pulled by its end extended beyond the rivet head and the tail is to be fully formed before the stem is to break or give. In such instance the gripped end of the rivet stem should be reinforced rather than made weaker. In order to obtain a rivet assembly with suitable stress conditions in our method the parts are formed in a definite order and under balanced stress conditions exerted at selected points.

In order to provide rivet assemblies the parts of which are in uniform relative position for easy handling and insertion into riveting tools, the stem is engaged with the hollow rivet with sufficient tightness to hold the assembly in predetermined relative position but to yield to the pulling force exerted when the rivet is fastened in place.

Figure 1:
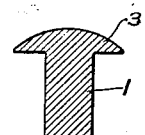
Fig. 1 is a sectional view of a solid rivet body.
Figure 2:
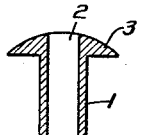
Fig. 2 is a sectional view of the solid rivet body with an axial hole through it.

The first step of making such rivet assemblies is the step of providing a hollow rivet body. At present the preferred method is to provide a solid rivet body 1 shown in Fig. 1 and drill or bore an axial hole 2 through the entire rivet body extended from its head 3 to its tail 4, as shown in Fig. 2.

Figure 3:
Fig. 3 is a side view of the stem of the rivet.
Figure 4:
Fig. 4 is a view of the rivet stem with the former head thereon.
Figure 5:
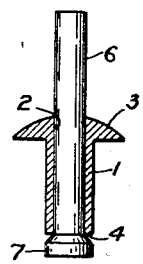
Fig. 5 is the stem assembled in the hole of the rivet body.
Figure 6:
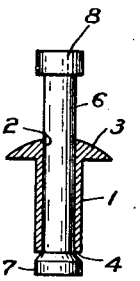
Fig. 6 is the completed rivet assembly with the gripping head on the end of the stem beyond the rivet head and the stem held in said position in the rivet.

The next step is to provide a stem 6, as shown in Fig. 3, to slidably fit into the axial hole of the rivet body 1. On one of the rivet stem 6 is then formed a tail former 7, as shown in Fig. 4. This step is at present performed on the rivet stem before its assembly in the rivet body.

The next step is to insert the rivet stem into the hole of the rivet body. This insertion is accomplished through the tail end of the rivet body so that the tail former is adjacent to the tail and the straight end of the stem extends through the head of the rivet body 1. It is to be noted that the stem is comparatively easily slidable into the hole of the rivet body.

The next step is to apply a forming force to the straight end of the rivet stem for forming a pulling or gripping surface on the straight end of stem outside the rivet head. In the herein form this is accomplished by exerting axial pressure upon the straight end of the rivet stem so as to bear against the formed end of the rivet stem, and to confine the enlargement of the stem at the pulling head 8 to a predetermined limited end portion of the stem spaced from the head of the rivet body. The entire rivet body is held exteriorly against deformation. Also preferably simultaneously with the forming step the stem in the rivet is expanded sufficiently to tighten the sliding fit between the hollow rivet body and the stem to hold them assembled in a predetermined relation and preferably so that the former is immediately adjacent to the tail end of the hole of the rivet body.

The product is a rivet assembly which includes a hollow rivet body, a stem slidable through the rivet body, a former on the end of the rivet stem adjacent the tail end of the rivet body, a pulling member at the other end of the stem spaced from the rivet head, said stem being slidable to be pulled in the hole of the rivet body but normally it is held tightly in place in said rivet body so as to hold the former and the pulling member on the stem in a predetermined constant relation to the rivet body of the assembly. This provides rivet assemblies with uniform outlines to facilitate their insertion and handling in suitable riveting apparatus.

Figure 7:
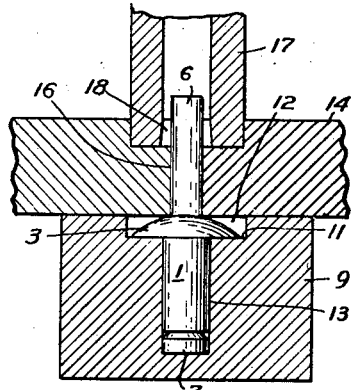
Fig. 7 is a somewhat diagrammatic view of the holding of the rivet assembly for the forming of the gripping head on the stem.
Figure 8:
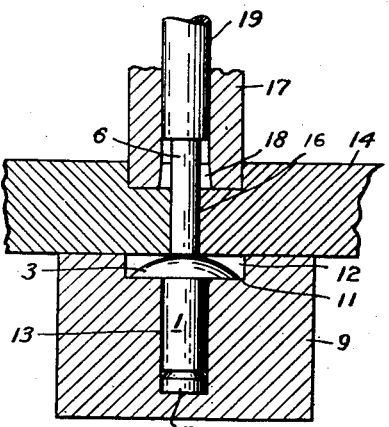
Fig. 8 is a somewhat diagrammatic view of the step of exerting the forming pressure on the rivet stem of the rivet.
Figure 9:
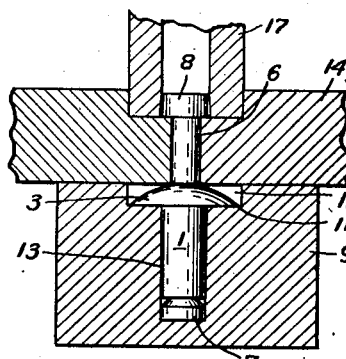
Fig. 9 is a somewhat diagrammatic view of the step of completion of the forming of the grip or pulling head of the rivet stem.
Figure 20:
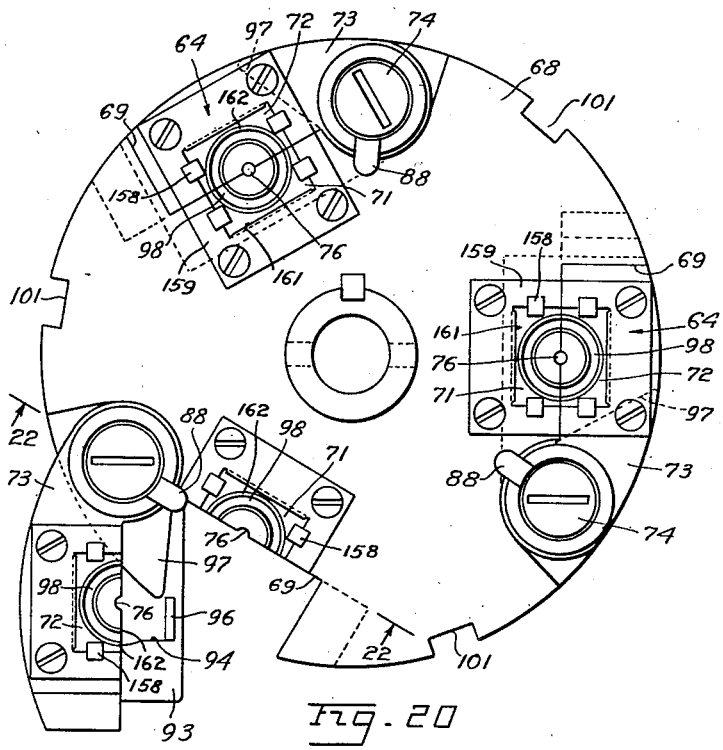
Fig. 20 is a detail face view of the die plate assembly of the automatic apparatus.
Figure 21:
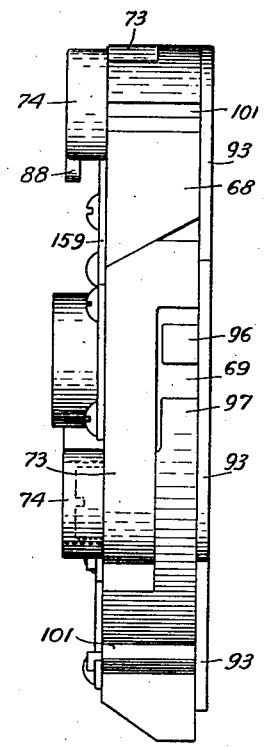
Fig. 21 is a side view of said die plate assembly.
Figure 22:
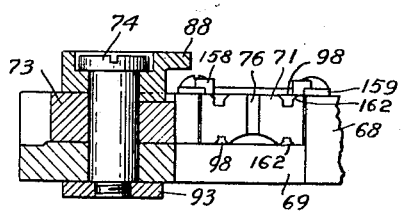
Fig. 22 is a fragmental sectional view taken on lines 22—22 of Fig. 20.
Figure 23:
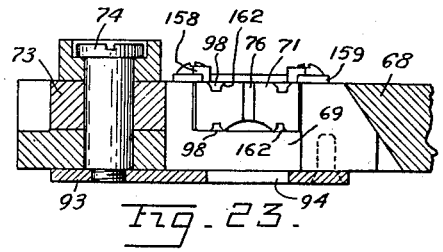
Fig. 23 is a fragmental sectional view through one of the holder dies in closed position.
Figure 24:
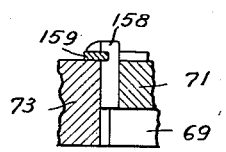
Fig. 24 is a sectional view of the key plate securing means of the die holder section.
Figure 25:
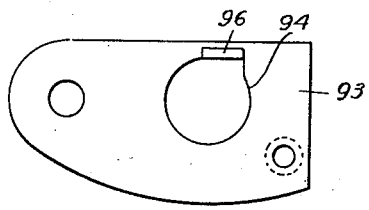
Fig. 25 is a detail view of the ejector plate on the die holder gate.

The carrying out of the step involving the forming of the pulling head is illustrated in Figures 7, 8, and 9 herein. The rivet body 1 is held in a holder 9 so that the bottom surface of the rivet head 3 rests on the bottom 11 of a recess 12 in said holder 9. The recess 12 is of the same height as the height of the rivet head 3 so as to protect the rivet head against pressure thereon. The rivet body 1 fits into a hole 13 of the holder 9. The depth of the holder hole 13 is equal to the distance from the bottom or outer end of the former 7 and the bottom surface of the rivet head 2 when the stem 6 is fully inserted into the rivet hole 3. On the top of the holder 9 rests a stem holder 14 which has an aperture 16 fitting accurately over the portion of the stem 6 from the top of the rivet head 2 to a point spaced from the upper or straighter end of said stem 6. Over the uncovered end portion of the stem 6 extends a die 17 which has a tapered cavity 18 in its end overlying the stem 6. The cavity 18 is larger than the stem diameter and is of the desired head contour. As shown in Fig. 8, a plunger 19 moves in said die 17 to axially engage the end of the stem 6. The pressure member or plunger 19 is moved down so as to apply gradually progressive axial compression on the end of the rivet stem 6 until the portion of the rivet stem 6 within the die cavity 19 is enlarged to fill said die cavity 19. This same axial pressure exerts an almost imperceptible enlargement of the stem 6 within the hollow rivet body 1 which however is sufficient to tighten the fit therein without deforming said rivet body 1. The gradual application of the axial compressive force in such limited area and the independent support of the rivet body produce a rivet assembly of properly balanced initial strain conditions with uniform spacing of heads so as to secure objects together with substantially uniform force. Uniformity of performance in riveting operations is of utmost importance, and rivets made in accordance with this method can be handled by the same tool speedily and respond uniformly under given conditions.

In Figures 10 to 12 an apparatus is shown for performing the step of setting the pulling head 8 of the rivet assembly. This apparatus includes a frame 21 with a die plate 22 and an overhead bracket 23 thereon opposite to each other. Into the center of the die plate 22 is inserted a holder 24 for the rivet assembly 26. The holder 24 is of the same type as the holder 9 heretofore described, except that the exterior of the holder 24 fits into the socket 27 of the die plate 22. The holder 24 has a vent 28 in its bottom extended from the holder hole 13 so as to facilitate the insertion and removal of the rivet assembly 26. The holder is so dimensioned that the rivet head 3 of the rivet assembly rests on the top of the holder as the tail former 7 rests on the bottom of the holder hole 13 when the stem 6 is fully inserted in place.

The stem holder of the apparatus is formed on the top of the die plate 22 by a pair of jaws 29 swingable horizontally around a common pivot 31. Complemental semi-cylindrical recesses 32 of these jaws 29 firmly fit the circumference of the rivet stem 6. These jaws 29 are normally urged apart by a tension spring 33 secured to lever arms 34 extended from the respective jaws 29. Handles 36 extend from the respective jaws 29 to facilitate the manipulation of said jaws 29. The jaws 29 are forced into closed position by latch cams 37, each pivoted at 38 outside of the respective jaws 29 and provided with a latch handle 39 for manipulation of the cams 37. The jaws 29 have complemental central recesses 41 at the bottom, which recesses 41 are of such depth as to fit over the rivet head 3 and protect the same from pressure. Complemental cut away portions 42 form a recess at the top of the jaws 29 through which a free portion and end of the stem 6 extends.

In the bracket 23 above the die plate 22 is slidably held a vertical rack 43 reciprocable in a suitable manner such as by means of a pinion 44 turnable by a handle 46. On the lower end of the rack 43 is a chuck 47 into which is secured a punch 48. A forming head 49 is slidably held on the punch 48 by a cross pin 51 which latter is fixed to the punch 48 and protrudes into slots 52 through the sides of the forming head 49. A coil spring 53 between the chuck 47 and the top of the head 49 urges the forming head 49 toward the end of the punch 48. Normally the end of the forming head 49 extends beyond the reduced end 54 of the punch 48. A die cavity 56 is provided in the end of the forming head 49. The die cavity 56 is of the same diameter as the reduced punch end 54 but it tapers outwardly toward its mouth. This flaring tapering of the die cavity 56 determines the shape of the pulling head formed on the stem and it also facilitates the removal of the forming head 49 from the formed pulling head of the rivet without sticking. The outside diameter of the forming head 49 fits into the recess 42 in the top of the jaws 29 so as to be centered thereby and axially aligned with the stem 6.

The downward stroke of the punch 48 is adjustably determined by an abutment collar 57 adjustably mounted on the rack 43 above the frame bracket 23. An abutment pin 58 in the collar 57 engages the top of the bracket 23 after a predetermined down stroke of the rack 43. This abutment is so adjusted as to stop the compressing action on the punch after the head of the stem is compressed to a desired size. This provides for uniformity of the shape as well as the strain conditions of the pulling head on the rivet stem 6.

In operation the latch cams 37 are first turned to allow the jaws 29 to move apart. Then a rivet assembly 26 is placed into the holder so that the tail former of the rivet is at the bottom of the holder recess 13. Then the latch cams 37 are turned again to close the jaws 29 tightly against the rivet stem 6. Then the rack 43 is moved downwardly until the end of the forming head 49 is centered within the top recess 42 of the jaws 29. Further movement of the rack 43 against the action of the coil spring 53 advances the reduced punch end 54 into the die cavity 56 and against the end of the rivet stem 6 so as to exert the force for forming the pulling head of the rivet. The punch 48 is advanced until the stop abutment pin 58 abuts the bracket 23 and thus stops further compression movement. Then the rack 43 is raised, the jaws are parted and the completed rivet assembly is removed from the machine. It is to be noted that the rack 43 may be moved quickly until the forming head 49 rests on the jaws 29 in forming position, but thereafter and during the punching operation the application of force is progressive and gradual.

The automatic apparatus shown in Figures 13 to 25 allows multiple operation at greater speeds and with greater efficiency yet it assures predetermined gradual pressure, automatic accurate alignment and uniform strain.

The automatic apparatus herein in general includes a rotatable die plate assembly 61, a bucking head assembly 62, a forming head assembly 63, and means to move the respective assemblies in timed relation to each other for forming the gripping surface or pulling portion 8 of the rivet assembly. The die plate assembly 61 carries a plurality of holder dies 64 in suitable locations successively to be brought into registry with the aligned bucking head assembly 62 and forming head assembly 63. Each holder die 64 is held in such forming position while the bucking head assembly 62 is operated to hold the formed end of the rivet stem of the rivet assembly, and the forming head assembly 63 is operated to form the gripping surface or head on the other end of the rivet stem of the rivet assembly. Means are provided to eject the completed rivet assembly from the holder dies 64 after the operation is completed. All the assemblies and driving mechanisms are supported on a suitable frame 66.

The die plate assembly 61 is supported on a shaft 67 which latter is suitably journalled on the frame 66. The shaft 67 is centrally keyed or fixed to a die plate 68 so as to rotate the die plate 68. The holder dies 64 are assembled in three equally spaced slots or cut away portions 69 in the periphery of the die plate 68. Each holder die 64 has a fixed half section 71 suitably secured to the adjacent sides of the slot 69 and a movable half section 72 mounted on a swingable gate 73 which latter is pivoted at a pivot 74 on the die plate 68. The pivot 74 is located at the leading end of the gate 73 so that the die gate 73 with the movable die section 72 can be opened speedily and then closed by the application of tangential force as the die plate 68 is rotated. The half sections 71 and 72 complement each other to form a cavity 76 which fits the head and stem of the rivet assembly, so that the tail former of the rivet assembly extends in the direction of the bucking head assembly 62.

The die plate 68 is surrounded by a brake band 77 one end of which is anchored at 78 to the frame 66. The other end 79 of the band 77 is anchored to an arm of a bell crank 81 which is fulcrumed on a bracket 82 on the frame 66 at a point spaced from the fixed anchor 78. The other arm of the bell crank 81 is yieldably pressed by a coil spring 83 so as to exert a pull for holding the band 77 under yieldable tension. This tension is adjustable by an adjusting screw 84 bearing against the spring 83 and supported in a lug 86 on the frame 66. It is to be noted that the end 79 of the band 77 is held below the level of the lowermost point of the die plate 68 in such position as to hold the adjacent portion of the band 77 at a substantially straight inclined line tangential to the periphery of the die plate 68 toward the direction of rotation. As the die plate 68 is rotated in clockwise direction, viewing Fig. 19, the outer curved surface 87 of the die gate 73 rides on the tangential portion of the band 77 and the tangential force thus exerted gradually closes the die gate 73 before it reaches its next operating position.

Each holder die 64 has three operating positions, namely the loading position at A in Fig. 19, where the rivet assembly is inserted into the holder die 64, the forming position at B in alignment with the bucking head assembly 62 and with the forming head assembly 63, and the ejecting position C at the gap between the anchor 78 and the other end 79 of the band 77 where the holder die 64 is opened and the completed rivet assembly is ejected from the apparatus. These three positions of the holder die 64 in the present illustration are about 120 degrees apart so that upon each one-third revolution of the die plate assembly 61 there is one holder die 64 in each of the three operating positions.

An abutment lug 88 is extended radially from the pivot 74 of each gate 73 so that the abutment lug 88 projects substantially toward the center of the die plate 68 when the gate 73 is in closed position. A striking plate 89 is mounted on a web 91 of the frame 66 adjacent the ejecting position of the die assembly 64. A striking pin 92 projects from the striking plate 89 toward the face of the die plate 68 and in the path of the abutment lug 88 of the die pivot 74. As the holder die 64 is carried around in a clockwise direction, viewing Fig. 19, the abutment lug 88 strikes the striking pin 92 and the leverage thus exerted swings the gate 73 and the movable die section 72 to the open position shown in Fig. 19. The abutment lug 88 rides around the lower surface of the striking pin 92 and clears the striking pin 92 before the gate 73 is acted upon by the tangential force of the band 77.

In order to prevent sticking of the rivet assembly in the holder die 64 positive means of ejection are also provided. An ejector plate 93 is extended from the forming side of each movable die section 72 so as to lie adjacent the face of the die plate 68. The ejector plate 93 has an aperture 94 therethrough to accommodate the head of the forming head assembly 63. An ejector ear 96 extends from the ejector plate 93 into the cut away slot 69. It is to be noted that the gate 73 and die sections 71 and 72 are generally narrower than the thickness of the die plate 68 and the ejector ear 96 extends into the forming side of the slot 69 not occupied by the die sections 71 and 72. As the die gate 73 is swung open at the ejecting position the ejector plate 93 swings with it and the ejector ear 96 is moved past the face of the fixed die section 71 so as to strike and eject the stem of the rivet assembly if the latter sticks in the fixed die section 71. An ejector lug 97 is extended from the corner of the die plate slot 69 adjacent the die pivot 74 and it projects over the outer portion of the forming face of the movable die section 72 so that the movable die section 72 is carried past said ejector lug 97 when the die assembly is opened. If the rivet assembly is stuck in the movable die section 72, then the stem of the rivet assembly strikes this ejection lug 97 and is ejected thereby.

The faces of the die sections 71 and 72 have semi-circular grooves therein which complement each other to form an annular aligning groove 98 on each face of each die assembly 64. The grooves 98 on the opposite faces of each die assembly are in alignment with each other and with the ends of the heads of the bucking head assembly 62 and of the forming head assembly 63 respectively. Thus the forming action is truly aligned with the axis of the stem of the rivet assembly.

The true alignment of the die plate assembly 61 with the bucking head assembly 62 and with the forming head assembly 63 is further assured by positively holding the die plate assembly 61 in its operative positions. This is accomplished by a latch 99 engaging one of three notches 101 in the periphery of the die plate 68. These notches 101 are spaced apart at the same angles as the three die assemblies 64 but are angularly offset so that one notch 101 is located intermediate between the locations of two adjacent holder dies 64. The latch 99 is slidably held in a bracket 102 on a web of the frame 66 in such position relatively to the die plate 68 that when one of the notches 101 is opposite to the latch 99 then one of the holder dies 64 is in accurate alignment with the bucking head assembly 62 and with the opposite forming head assembly 63, and at the same time another holder die 64 is in loading position and the third holder die 64 is in ejecting open position. A coil spring 103 in the bracket 102 urges the latch 99 substantially radially outwardly away from the periphery of the die plate 68. The latch 99 is moved toward the periphery of the die plate 68 by a rotating cam 104 adjustable on a shaft 106 so as to push the latch 99 toward the periphery of the die plate 68 after each one third revolution of the die plate 68 is completed and to release the latch 99 after the completion of each forming operation and just before the die plate 68 is again rotated into another operating position.

The bucking head assembly 62 includes a hollow traveling bar 107 of rectangular cross section which is reciprocable in an aligning bearing 108 in a fixed block 109 so as to be aligned with the forming position of the holder die 64. A bolt 111 is adjustably threaded into the end of the bar 107 nearer the die plate 68 and is held in adjusted position by means of a suitable set screw 112. A portion 113 of the bolt 111 is enlarged and is threaded so as to hold thereon the internally threaded bucking head 114 which is held in adjusted positions by a suitable set screw 116. The end of the bucking head 114 tapers to an annular tip flange 117 which fits into the aligning groove 98 of the die assembly 64 in forming position. The depth of the tip flange 117 is the same as the depth of the aligning groove 98. The end of the bucking head 114 has a central hole 118 which fits over the tail former of the stem of the rivet assembly which is being backed by the bucking head assembly 62. A bucking plug 119 is formed on the outer end of the bolt 111 which plug 119 protrudes into the central hole 118 to engage the end of the tail former of the rivet stem. In order to adjust the bucking head to the length of the tail former of the rivet stem the bucking head 114 is axially adjusted on the bolt 111 so as to protrude the bucking plug 119 into the central hole 118 of the bucking head 114 to the desired depth. The length of the bucking head assembly and the pressure can be also adjusted by adjusting the length of the bolt 111 in the traveling bar 107.

The forming head assembly 63 includes a hollow traveling bar 121 of rectangular cross section reciprocable in a bearing 122 in a block 123 aligned with the forming position of the holder die 64 and oppositely to the bucking head assembly 62. A plunger 124 is adjustably fixed in the end of the traveling bar 121 by a threaded engagement and a suitable set screw. On the plunger 124 is slidable a forming head 126 slidably held in place by a cross pin 127 fixed across the plunger 124. The forming head 126 has longitudinal slots 128 which are slidable over the protruding ends of the cross pin 127. The forming head 126 terminates in an annular flange tip 129 which fits into the adjacent aligning groove 98 of the die assembly 64 in forming position. The depth of this flange tip 129 is of the same depth as the depth of the aligning groove 98. In the end of the forming head 126 is a die cavity 131 of the same kind as the die cavity 18 heretofore described. A forming punch 132 at the end of the plunger 124 protrudes into the forming die cavity 131. Normally the forming head 126 is urged by a coil spring 133 toward the end of the plunger 124 so that it extends beyond the end of the plunger 124 and the punch 132 is practically completely withdrawn from the forming cavity 131. This spring 133 bears against the traveling bar 121 at one end and against the forming head 126 at its other end. As the traveling bar 121 is advanced toward the die plate 68 the forming head 126 first contacts the aligning groove 98 in the adjacent face of the holder die 64 in forming position and locates the forming head 126 in position. Upon continued advance of the traveler bar 121 the force is progressively exerted against the action of the coil spring 133 as the plunger 124 is advanced into the head 126 and the punch 132 is forced into the forming die cavity 131 and against the end of the stem of the rivet assembly.

The bucking head assembly 62 and the forming head assembly 63 are reciprocated respectively by cams 136 and 134. Motion is transmitted from each of said cams 134 and 136 by means of a follower 137 suitably journaled in a yoke 138 on the end of the traveler bar 107 or 121. The followers 137 are in aligned rolling contact with the respective cams 134 and 136. Within each traveler bar 107 or 121 is a coil spring 139 which bears against a pin 141 at the yoke 138 at one end and against a stationary cross pin 142 at its other end. The cross pins 142 are fixed in the respective bearings 108 and 122 and extend through elongated slots 143 on the opposite sides of the respective traveling bars 107 or 121. The coil springs 139 urge the traveling bars 107 and 121 outwardly away from the die plate 68 and keep the followers 137 in constant rolling contact with the respective cams 134 and 136. It is to be noted that the cams 134 and 136 are adjusted so as to move the bucking head assembly 62 into operating position slightly in advance to the innermost stroke of the forming head assembly 63.

The driving of the apparatus is accomplished in synchronism so that the various moving parts move into operative positions in predetermined relation to each other and to the rivet assembly worked on. Power is transmitted to the apparatus through a driving wheel or fly wheel 144. The wheel 144 is driven in any suitable manner not shown. The wheel 144 rotates a shaft 146 suitably journaled in pillow blocks 147 adjacent the forming head assembly 63. The cam 134 is suitably mounted on the shaft 146 and is rotated thereby for the operation of the forming head assembly 63 as heretofore described.

A suitable gear transmission 149 transmits rotation from the shaft 146 to the longitudinal shaft 106 which rotates the latch cam 104 for moving the latch 99 into or out of the adjacent holding notches 101 in the periphery of the die plate 68. The shaft 106 extends longitudinally of the apparatus and is suitably journaled in cross webs of the frame 66.

Another gear transmission 151 transmits rotation from the longitudinal shaft 106 to another transverse shaft 150 journaled in suitable pillow blocks 148 outside of the bucking head assembly 62. The cam 136 is mounted on this second transverse shaft 150 so as to reciprocate the bucking head assembly 62 in the manner heretofore described.

The shaft 67 for the die plate 68 extends substantially parallel with the longitudinal shaft 106 and it is suitably supported on the frame 66. This die plate driving shaft 67 has on its outer end a pair of parallel spaced discs 152. Three pins 153 with rollers thereon are secured between the discs 152 in positions corresponding to the relative angular positions of the holder dies 64 on the die plate 68. Intermittent rotation of the die plate shaft 67 is accomplished by a crank 154 on the longitudinal shaft 106, and by a pawl 156 pivotally supported on the crank 154 at such an angle that the pawl 156 drops by its own gravity into the space between the discs 152 and over the pins 153. As the crank 154 is rotated one revolution in a contraclockwise direction, viewing Fig. 16, the pawl 156 drops over the pin 153 nearest to the hooked end 157 of the pawl 156 and then as the crank rises in its rotation the hooked end 157 engages the adjacent pin 153 and pulls it upwardly so as to rotate the discs 152 and the die plate driving shaft 67 therewith. The hooked end 157 of the pawl 156 remains engaged with the pin 153 until about the uppermost rotative point of the crank 154 where the crank 154 turns downwardly again causing the downward swinging of the pawl 156. During this downward swinging the pawl 156 rides on the first pin 153 so as to keep the hooked end 157 on the outside of the pins 153. Then as the crank 154 turns again upwardly it pulls the pawl 156 away from the upper pin 153 and allows the hooked end 157 of the pawl 156 to drop under the next pin 153 for lifting the same. The length of the pawl 156 and the relative position of the pins 153 are such that during each revolution of the crank 154 with the longitudinal shaft 106 the discs 152 are turned one-third of one revolution and the movement is performed only during the upward half of the crank revolution. Thus an intermittent motion is accomplished with a pause corresponding to about one half of the revolution of the continuously revolving cams and shafts of the apparatus. The cams 134 and 136 are so related to the pawl and disc drive of the die plate 68 that the operating movement of the bucking head assembly 62 and of the forming head assembly 63 for the forming operation is performed during the idle return movement of the crank 154 while the discs 152 and the die plate drive shaft 67 are at a standstill. The latch cam 104 is so adjusted that it releases the latch 99 during the upward effective rotation of the crank 154 and presses the latch 99 in when the pawl is disconnected from the pin 153. The outward return movement of the bucking head assembly 62 and of the forming head assembly 63 is performed while the discs 152 and the die plate shaft 67 rotate the die plate 68 one third of one revolution.

In operation the rivet assembly is inserted into the die assembly 64 at the loading position A, viewing Fig. 19. The insertion is endwise from the side shown in Fig. 18 so that the straight end of the rivet stem is automatically or manually inserted into and through the die cavity 76, the tail former facing toward the bucking head side of the die plate 68. This loading is performed while the machine is in operation although the die plate 68 is at a momentary standstill. Then the die plate 68 is moved intermittently one third of one revolution by the aforedescribed crank 154, pawl 156, pins 153, discs 152 and shaft 67. During this movement of the die plate assembly the latch 99 is held out of engagement with the periphery of the die plate 68. The completion of one third of one revolution changes the operative positions of the holder dies 64 so that the loaded holder die 64 reaches its forming position at B, viewing Fig. 19. As soon as the die plate assembly 61 is at a standstill the latch 99 is forced into the opposite notch 101 and fixes the die plate 68. At the same time the bucking head assembly 62 is moved by the cam 136 into engagement with the holder die 64 and thereafter with a slight delay the forming head assembly 63 is moved into operative position by the other cam 134 and performs the forming operation on the rivet stem. Then the cams 134 and 136 disengage the forming head assembly 63 and the bucking head assembly 62 from the holder die 64, and the latch cam 104 releases the latch 99 from the die plate 68, and the crank 154 pulls the pawl 157 upwardly to turn the die plate assembly 61 again one-third of one revolution. This movement brings the said holder die 64 in which the rivet is formed to the unloading or ejecting position. As the holder die 64 passes the anchor 78 the gate 73 is free to drop to open position. In addition the abutment lug 88 strikes the striking pin 92 and forces the gate 73 open as shown at C in Fig. 19. During the opening of the die gate 73 the complete rivet assembly is ejected from the die assembly 64 at the position C either by ejector ear 96 of ejector plate 93 or by the ejector lug 97 according to whether the rivet assembly is in the fixed half section 71 or movable half section 72 of the holder die 64. By providing a suitably timed feeding device the rivet assembly can be fed automatically into the die assembly 64 at the loading position A. The frame 66 may be of any suitable structure and the various pillow blocks and bearings are supported on suitable webs and cross members on said frame 66. The entire apparatus is compact, it is easily adjustable for synchronized operation, and it is well adapted for the performance of the respective steps of completing the rivet assembly as heretofore described.

In order to further assure uniformly accurate alignment in this apparatus between the bucking head assembly 62, the forming head assembly 63 and the rivet assembly in the die plate assembly 61, the holder die 64 is floatingly supported in the die plate 68 so as to be self adjustable when engaged at its opposite sides just before the forming operation. This is accomplished by mounting each die section 71 and 72 on keys 158 with a limited clearance for self adjustment. A key plate 159 is also made in sections to fit over the die plate 68 and over the gate 73 respectively and engage the heads of the keys 158 for holding the same in place. Opposite narrow flanges 161 on these key plates 159 protrude over the adjacent edges of the respective die sections 71 and 72 so as to prevent the pushing of the die sections 71 and 72 out of the die plate assembly 61 during the loading operation. The shifting of the holder die 64 to accurate position between the bucking head 114 and forming head 126 is accomplished by the engagement of the respective tip flanges 117 and 129 first with flared rims 162 at the mouths of the respective die aligning grooves 98 on the opposite faces of the assembled die sections 71 and 72. The tip flanges 117 and 129 shift the floating die assembly until the grooves 98 are accurately aligned for true engagement with the tip flanges 117 and 129, and they also shift the die axially if necessary so that both tip flanges 117 and 129 penetrate equally into the aligning grooves 98. This self adjustment is usually very minute but it accurately locates the rivet assembly in exactly the same relative position during each forming operation so that the relative forming forces are always applied in the same manner.

We claim:

1. Apparatus for completing a rivet assembly of a tubular rivet and a former stem member extended through said rivet comprising, a holder for holding the tubular rivet and the tail end of the stem member in a predetermined assembly position, a removable holder to engage the stem member between the rivet head and the other end of the stem member, a forming head movable over the end of the stem above said removable holder, and a plunger movable in the forming head to form an engagement head on said end and to tighten said stem in said tubular rivet in said predetermined position.

2. Apparatus for completing a rivet assembly of a tubular rivet and a former stem extended through said rivet, comprising, a holder for holding the tubular rivet and the tail end of the stem in a predetermined relative position, separable holder elements for engaging the stem outside of the head of said rivet, a forming head movable over the end of the stem at said separable holding elements, and a plunger element movable in the forming head to form an engagement head on said end at said separable holding elements and to tighten said stem in said tubular rivet in said predetermined position, the cavity of said first holder fitting the outer surface of the tubular rivet from the rivet head to the tail end.

3. Apparatus for completing a rivet assembly of a tubular rivet and a former stem member extended through said rivet comprising, a holder to engage the outer surface of the hollow rivet from its head to its tail end, means to hold the stem near said tail end against axial displacement relatively to said hollow rivet, separable die elements at the head of the rivet to engage the portion of the stem extended beyond said head, and forming means to apply axial forming pressure to the end of said stem portion spaced from said head.

4. Apparatus for completing a rivet assembly of a tubular rivet and a former stem member extended through said rivet comprising, a holder to engage the outer surface of the hollow rivet from its head to its tail end, means to hold the stem near said tail end against axial displacement relatively to said hollow rivet, separable die elements at the head of the rivet to engage the portion of the stem extended beyond said head, a forming die extended over the end of said portion of said rivet stem, and a pressure member movable in said forming die to apply axial pressure to said stem and in said forming die for forming a head on said stem end.

5. Apparatus for completing a rivet assembly of a tubular rivet and a former stem member extended through said rivet comprising, a holder to engage the outer surface of the entire hollow rivet from its head to its tail end, means to hold the stem near said tail end against axial displacement relatively to said hollow rivet, releasable means at the head of the rivet to hold the portion of the stem extended beyond said head, a forming die extended over the end of said portion of said rivet stem, a pressure member movable in said forming die to apply axial pressure to said stem end in said forming die for forming a head on said stem end and coacting aligning elements on said releasable means and on said forming die to align said forming die on said stem end.

6. Apparatus for completing a rivet assembly of a tubular rivet and a former stem member extended through said rivet comprising, a holder for the tubular rivet, said holder being formed of two parts hinged together adapted to grip the stem of said rivet assembly, bucking means movable against one side of the holder to engage the adjacent end of the stem, forming means movable against the other side of the holder, means movable in said forming means to apply forming force to the portion of the stem in said forming means, means to move said bucking means, said forming means, and said force applying means in predetermined timed relation to each other, means to hold the parts of the holder together during the head forming and to open said parts to release said rivet stem.

7. Apparatus for completing a rivet assembly of a tubular rivet and a former stem member extended through said rivet comprising, a holder for the tubular rivet, said holder being formed of two parts hinged together adapted to grip the stem of said rivet assembly, bucking means movable against one side of the holder to engage the adjacent end of the stem, forming means movable against the other side of the holder, means movable in said forming means to apply forming force to the portion of the stem in said forming means, means to move said bucking means, said forming means, and said force applying means in predetermined timed relation to each other, means to hold said parts of the holder together to grip the stem during the forming of said engagement head and to open said parts to release the rivet stem after the head is formed, said holder having a cavity therein conforming to the contour of the tubular rivet and adapted for endwise insertion of the rivet assembly so that the free end of the rivet stem extends beyond the face of the holder toward the forming means.

8. Apparatus for completing a rivet assembly of a tubular rivet and a former stem member extended through said rivet comprising, a die plate assembly, a plurality of holding dies spaced on the die plate assembly, means to intermittently rotate the die plate assembly to move the holding dies successively into rivet assembly receiving position, rivet assembly forming position and rivet assembly ejecting position, bucking means aligned with the rivet assembly forming position of the holder dies and movable against one side of said holding dies to engage the adjacent end of the rivet stem member, forming means aligned with the bucking means and movable against the other side of the holder dies over the free end of the rivet stem, movable means in said forming means to apply the forming forces to said free end of the rivet stem, and means to operate said bucking and forming means and said intermittent rotating means in synchronism.

9. Apparatus for completing a rivet assembly of a tubular rivet and a former stem member extended through said rivet comprising, a die plate assembly, a plurality of holding dies spaced on the die plate assembly, means to intermittently rotate the die plate assembly to move the holding dies successively into rivet assembly receiving position, bucking means aligned with the rivet assembly forming position of the holding dies and movable against one side of said holder dies to engage the adjacent end of the rivet stem member, forming means aligned with the bucking means and movable against the other side of the holder dies over the free end of the rivet stem, movable means in said forming means to apply the forming forces to said free end of the rivet stem, means to operate said bucking and forming means and said intermittent rotating means in synchronism, and means to eject the complete rivet assembly from each holder die when the holder die is carried into the ejecting position by said die plate assembly.

10. Apparatus for making rivet assemblies including a tubular rivet and a tension member extended through said tubular rivet comprising, a holder having a cavity therethrough fitting the outer surface of the tubular rivet, means to engage the tail end of the tension member, a holder die to engage the tension member outside the head of the tubular rivet, a hollow die member movable over the holder die, means in said die member for determining the shape of the head to be formed on the end of the tension member, and a forming plunger movable in said hollow die member to a predetermined stroke to apply forming force to the end of the tension member within the cavity of said hollow die member.

11. Apparatus for making rivet assemblies including a tubular rivet and a tension member extended through said tubular rivet comprising, a holder having a cavity therethrough fitting the outer surface of the tubular rivet, means to engage the tail end of the tension member, a holder die to engage the tension member outside the head of the tubular rivet, a hollow die member movable over the holder die, means in said die member for determining the shape of the head to be formed on the end of the tension member, and a forming plunger movable in said hollow die member to a predetermined stroke to apply forming force to the end of the tension member within the cavity of said hollow die member, said holder die being made of sections complementing each other to form said cavity therein, and means to separate said sections for the ejection of the rivet assembly after completion of each forming operation.

12. A rivet assembly making apparatus of the character described comprising, a die plate, a stationary holder section on the die plate for the rivet assembly, a movable holder section for clamping said rivet assembly into said stationary holder section, a bucking head movable against one side of the closed complemental holder sections to engage one end of the rivet assembly, a forming head movable against the other side of the closed holder sections and over the other end of the rivet assembly, a pressure element movable in said former head to form a gripping portion on the end of the rivet assembly in said former head, and coacting means on said heads and on the respective sides of the holder sections to axially align said heads with the axis of the rivet assembly.

13. A rivet assembly making apparatus comprising a die plate assembly for holding the rivet assembly, a bucking head for engagement with one end of the rivet assembly, a forming head for engagement with the other end of the rivet assembly for forming a gripping surface on said latter end, said die plate assembly including a stationary holder section, and a swingable holder section, said holder sections complementing each other to fit the rivet assembly, means to automatically close and open said swingable holder section, an ejector on the swingable holder section to eject the rivet from said stationary rivet section when the swingable section is swung open, and an ejector on the die plate to eject the rivet assembly from said swingable section when the latter is swung open.

14. A rivet assembly making apparatus of the character described comprising, a bucking head for engagement with one end of the rivet assembly, a forming head for engagement with the other end of the rivet assembly for forming a gripping surface on said latter end, a die plate assembly, a stationary holder section on the die plate assembly, a movable holder section on the die plate assembly, said holder sections complementing each other to fit the rivet assembly, said die plate assembly being movable to carry said holder sections into aligned position between said bucking head and said forming head, means to automatically close said sections together when carried to said aligned positions, means to separate said sections from each other after being moved away from said aligned position, and means to eject the rivet assembly from said holder sections at about the point of separation.

15. A rivet assembly making apparatus comprising a bucking head for engagement with one end of the rivet assembly, a forming head opposite to the bucking head for engagement with the other end of the rivet assembly for forming a gripping portion on said latter end, a die plate assembly between said bucking head and said forming head, said die plate assembly including a rotatable element, a plurality of fixed rivet holder sections circumferentially spaced on and carried by said rotatable element, a swingable rivet holder section complementing each fixed rivet holder section to fit said rivet assembly, and guide means to hold each swingable rivet holder section in closed position on its fixed holder section after the insertion of a rivet assembly and while the holder sections and the rivet assemblies are carried to and held between said bucking head and said forming head, and means to swing each swingable holder section away from said fixed holder section after said complemental holder sections are carried away from said bucking head and forming head, said complemental holder sections being radially spaced from the center of rotation of said rotatable element to be in operative alignment with said bucking head and said forming head when held between said heads by said element.

16. A rivet assembly making apparatus comprising a bucking head for engagement with one end of the rivet assembly, a forming head opposite to the bucking head for engagement with the other end of the rivet assembly for forming a gripping portion on said latter end, a die plate assembly between said bucking head and said forming head, said die plate assembly including a rotatable element, a plurality of fixed rivet holder sections circumferentially spaced on and carried by said rotatable element, a swingable rivet holder section complementing each fixed rivet holder section to fit said rivet assembly, and guide means to hold each swingable rivet holder section in closed position on its fixed holder section after the insertion of a rivet assembly and while the holder sections and the rivet assemblies are carried to and held between said bucking head and said forming head, and means to swing each swingable holder section away from said fixed holder section after said complemental holder sections are carried away from said bucking head and forming head, said complemental holder sections being radially spaced from the center of rotation of said rotatable element to be in operative alignment with said bucking head and said forming head when held between said heads by said element, said guide means comprising a band surrounding said die plate assembly, and means to urge said band against said swingable sections, said band being spaced from the periphery of the die plate assembly at a portion of said periphery to release the swingable holder section opposite said portion.

17. A rivet assembly making apparatus, comprising, a bucking head for engagement with an end of the rivet assembly, a forming head opposite the bucking head for engagement with the outer end of the rivet assembly for forming a gripping portion thereon, a rotatable die plate between said heads, a plurality of rivet assembly holders circumferentially spaced from one another on the die plate and spaced radially from the center of rotation of said die plate to be aligned with said heads when carried between said heads by said plate; each rivet assembly holder including a fixed holder section, and a radially outwardly swingable section complementing said fixed holder section to fit said rivet assembly; a guide surrounding a part of said plate periphery, said swingable holders riding on said guide and being held in closed position thereby, an abutment on each swingable section, and an element at about the point where the said section leaves said guide when said die plate is rotated to be struck by said abutment for swinging said swingable section into open position; and ejector means on said holder sections to strip the rivet assembly from the holder sections when said swingable section is opened.

18. A rivet assembly making apparatus comprising a bucking head for engagement with one end of the rivet assembly, a forming head opposite to the bucking head for engagement with the other end of the rivet assembly for forming a gripping portion on said latter end, a die plate assembly between said bucking head and said forming head, said die plate assembly including a rotatable element, a plurality of fixed rivet holder sections circumferentially spaced on and carried by said rotatable element, a swingable rivet holder section complementing each fixed rivet holder section to fit said rivet assembly, and guide means to hold each swingable rivet holder section in closed position on its fixed holder section after the insertion of a rivet assembly and while the holder sections and the rivet assemblies are carried to and held between said bucking head and said forming head, and means to swing each swingable holder section away from said fixed holder section after said complemental holder sections are carried away from said bucking head and forming head, said complemental holder sections being radially spaced from the center of rotation of said rotatable element to be in operative alignment with said bucking head and said forming head when held between said heads by said element, means to intermittently rotate said die plate assembly to bring said complemental holder sections successively into registry with said bucking heads and forming heads, and a mechanism to operate said bucking head and forming head during each intermission of said die plate assembly rotation.

CARL W. CHERRY.
ALEX S. MULLGARDT.